US008286201B2

(12) United States Patent
Lee et al.

(10) Patent No.: US 8,286,201 B2
(45) Date of Patent: Oct. 9, 2012

(54) DIGITAL BROADCASTING RECEIVER AND A DATA PROCESSING METHOD

(75) Inventors: Chul Soo Lee, Seoul (KR); Sang Kil Park, Seoul (KR)

(73) Assignee: LG Electronics Inc., Seoul (KR)

( * ) Notice: Subject to any disclaimer, the term of this patent is extended or adjusted under 35 U.S.C. 154(b) by 942 days.

(21) Appl. No.: 12/316,498

(22) Filed: Dec. 11, 2008

(65) Prior Publication Data

US 2009/0150916 A1 Jun. 11, 2009

Related U.S. Application Data

(60) Provisional application No. 61/012,788, filed on Dec. 11, 2007.

(30) Foreign Application Priority Data

Nov. 21, 2008 (KR) ........................ 10-2008-0116236

(51) Int. Cl.
*H04N 7/16* (2011.01)

(52) U.S. Cl. .................. 725/6; 725/8; 725/31; 725/104; 725/131; 725/139; 725/151; 380/229; 380/232; 380/3.06; 380/407; 705/52; 705/66; 705/67; 705/69; 705/40; 705/41

(58) Field of Classification Search ........................ None
See application file for complete search history.

(56) References Cited

U.S. PATENT DOCUMENTS

| | | | | |
|---|---|---|---|---|
| 7,340,758 | B1 * | 3/2008 | Schwenk et al. | 725/6 |
| 7,945,704 | B2 * | 5/2011 | Singh et al. | 710/5 |
| 2003/0172375 | A1 * | 9/2003 | Shaw et al. | 725/9 |
| 2004/0077372 | A1 * | 4/2004 | Halpern | 455/550.1 |
| 2009/0177585 | A1 * | 7/2009 | Eskicioglu et al. | 705/67 |

* cited by examiner

*Primary Examiner* — Dominic D Saltarelli
*Assistant Examiner* — Jason J Chung
(74) *Attorney, Agent, or Firm* — Lee, Hong, Degerman, Kang & Waimey

(57) ABSTRACT

A digital broadcasting system and a data processing method are disclosed. A data processing method of a digital broadcasting receiver comprises receiving a mobile/handheld (MH) broadcasting signal including mobile service data and main service data; generating a RS (Reed-Solomon) frame from the received MH broadcasting signal; extracting control data from the RS frame, the control data including charge adjustment information required to use a service provided by at least one service provider, the service being encrypted; determining whether the service is available, by comparing the extracted charge adjustment information with balance information written in the smart card; controlling the second RS frame using the control data so that an encrypted service of the second RS frame is decrypted, if the service is available; and mapping the extracted charge adjustment information with a corresponding service provider and storing the information.

6 Claims, 8 Drawing Sheets

DIGITAL BROADCASTING RECEIVER AND A DATA PROCESSING METHOD

This application claims the benefit of U.S. Provisional Application No. 61/012,788, filed on Dec. 11, 2007, which is hereby incorporated by reference. Also, this application also claims the priority benefit of Korean Application No. 10-2008-0116236, filed on Nov. 21, 2008, which is hereby incorporated by reference.

BACKGROUND OF THE INVENTION

1. Field of the Invention

The present invention relates to a digital broadcasting system, and more particularly, to a digital broadcasting receiver and a method for controlling the same.

2. Discussion of the Related Art

A digital broadcasting system can include a digital broadcasting transmitter and a digital broadcasting receiver. Also, the digital broadcasting transmitter processes data such as broadcasting program in a digital mode, and transmits the processed data to the digital broadcasting receiver. Such a digital broadcasting system will gradually substitute for an analog broadcasting system owing to various advantages such as efficiency in data transmission.

In addition, although a mobile digital broadcasting system has been discussed recently, there is little technology for activating a pay service and efficiently managing a process related to the pay service.

SUMMARY OF THE INVENTION

Accordingly, the present invention is directed to a digital broadcasting receiver and a data processing method that substantially obviate one or more problems due to limitations and disadvantages of the related art.

An object of the present invention is to provide a digital broadcasting receiver and a data processing method that can activate a pay service in a digital broadcasting environment (for example, mobile digital broadcasting environment).

Another object of the present invention is to provide a digital broadcasting receiver and a data processing method that can efficiently manage a process related to a pay service in the digital broadcasting environment.

To achieve these objects and other advantages and in accordance with the purpose of the invention, as embodied and broadly described herein, a data processing method of a digital broadcasting receiver according to one embodiment of the present invention comprises receiving a mobile/handheld (MH) broadcasting signal including mobile service data and main service data; generating RS (Reed-Solomon) frames from the received MH broadcasting signal; extracting control data from the first RS frame, the control data including charge adjustment information required to use a service provided by at least one service provider, the service being encrypted; determining whether the service is available, by comparing the extracted charge adjustment information with balance information written in the smart card; controlling the second RS frame using the control data so that an encrypted service of the second RS frame is decrypted, if the service is available; and mapping the extracted charge adjustment information with a corresponding service provider and storing the information.

In another aspect of the present invention, a digital broadcasting receiver according to one embodiment of the present invention comprises a receiver receiving a mobile/handheld (MH) broadcasting signal including mobile service data and main service data; a generator generating RS (Reed-Solomon) frames from the received MH broadcasting signal; an extractor extracting control data from the first RS frame, the control data including charge adjustment information required to use a service provided by at least one service provider, the service being encrypted; a decision unit determining whether the service is available, by comparing the extracted charge adjustment information with balance information written in the smart card; a controller controlling the encrypted service using the control data so that the encrypted service is decrypted, if the service is available; and a storage unit mapping the extracted charge adjustment information with a corresponding service provider and storing the information.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
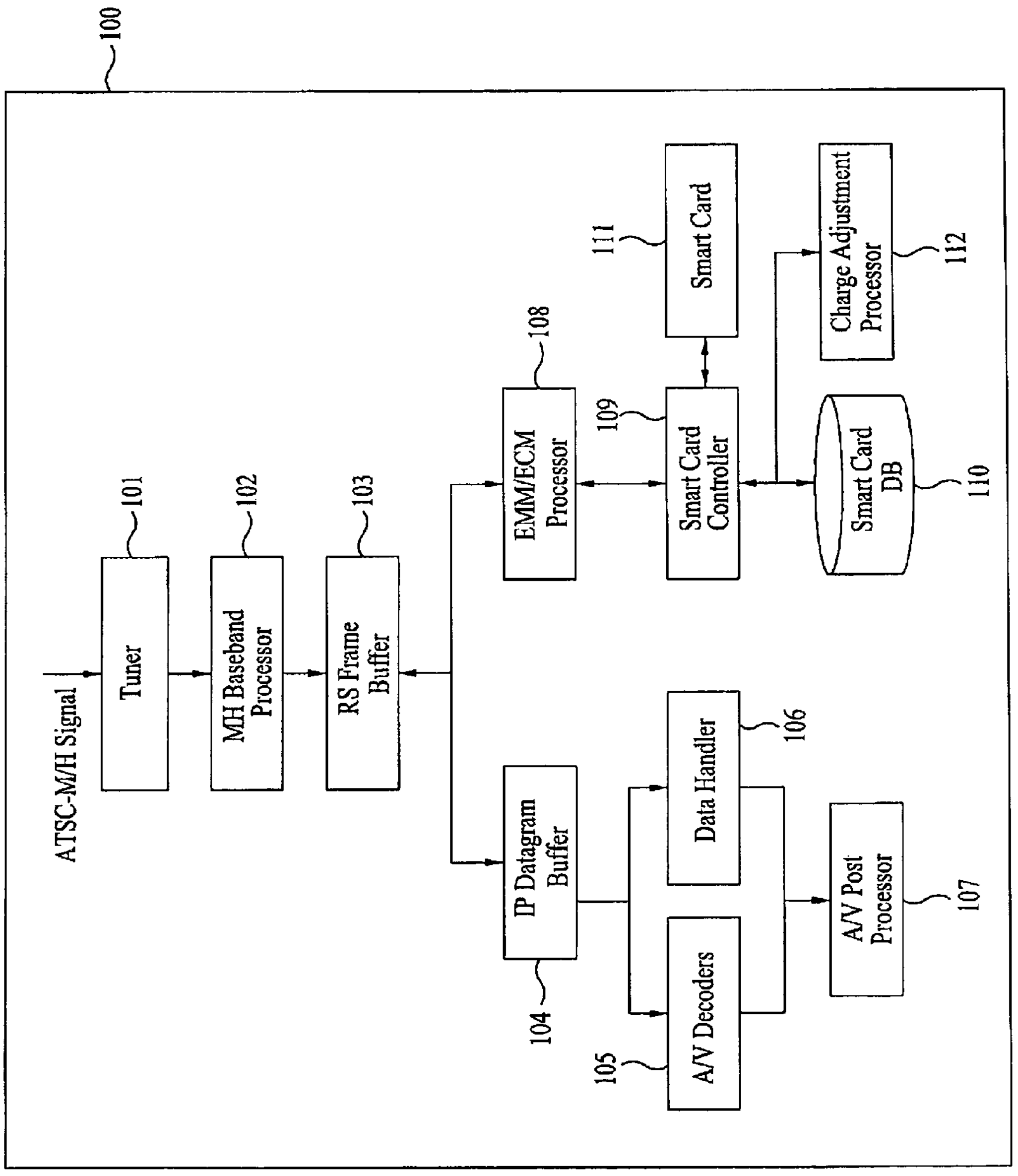
FIG. 1 is a block diagram illustrating a configuration module of a digital broadcasting receiver according to one embodiment of the present invention.

Reference will now be made in detail to the preferred embodiments of the present invention, examples of which are illustrated in the accompanying drawings. Wherever possible, the same reference numbers will be used throughout the drawings to refer to the same or like parts.

Hereinafter, the embodiments of the present invention will be described with reference to the accompanying drawings and the description disclosed in the accompanying drawings, but the present invention is not limited by the embodiments.

Although the terms used in the present invention are selected from generally known and used terms considering their functions in the present invention, the terms can be modified depending on intention of a person skilled in the art, practices, or the advent of new technology. Also, in special case, the terms mentioned in the description of the present invention may be selected by the applicant at his or her discretion, the detailed meanings of which are described in relevant parts of the description herein. Accordingly, the terms used herein should be understood not simply by the actual terms used but by the meaning lying within and the description disclosed herein.

Furthermore, the term, control access (or conditional access) will be used throughout the description of the present invention. The control access (or conditional access) corresponds to an encrypted state (scrambled state) of mobile service data, main service data, etc. that can be used by only a specific user or a specific digital broadcasting receiver. In more detail, the control access (or conditional access) may correspond to a case where a conditional access function is set by a control access system (or conditional access system (CAS)).

Furthermore, the term, control data will be used throughout the description of the present invention. The control data corresponds to data required to remove a control access function of data belonging to the control access. The control data may be used as a key value.

Meanwhile, among the terms used in the present invention, MH is abbreviated from mobile handheld, and is opposite to a fixed type. MH service data includes at least one of mobile service data and handheld service data. For convenience of description in the present invention, the MH service data may be referred to as mobile service data. At this time, any service data which means mobile data or portable data, as well as MH service data, can be included in the mobile service data. Accordingly, the mobile service data will not be limited to the MH service data.

The mobile service data defined as above may be data having information such as program working file and stock information, or may be A/V data. Particularly, the mobile service data is service data for portable or mobile terminal (or broadcasting receiver), and may be A/V data having smaller resolution and smaller data rate than those of the main service data. For example, if A/V codec used for the existing main service is MPEG-2 codec, MPEG-4 AVC (advanced video coding), SVC (scalable video coding), etc., which have more excellent video compression efficiency, may be used as the A/V codec for mobile service. Also, any kind of data may be transmitted as the mobile service data. For example, TPEG (transport protocol expert group) data for broadcasting traffic information in real-time can be transmitted as the mobile service data.

Furthermore, examples of data services using the mobile service data according to the present invention include, but are not limited to, weather service, traffic service, stock service, viewer joining quiz program, real-time public opinion census, interactive education broadcasting, game service, information provision service on plot of drama, character, background music, and drama studio, information provision service on past game results of sports, profile of player, and score of player, and information provision service on product information and program per service, media, time, or theme to order the product.

FIG. 1 is a block diagram illustrating a configuration module of a digital broadcasting receiver according to one embodiment of the present invention. Hereinafter, a data processing method of a digital broadcasting receiver according to one embodiment of the present invention will be described with reference to FIG. 1.

As illustrated in FIG. 1, the digital broadcasting receiver 100 can include a tuner 101, MH baseband processor 102, RS frame buffer 103, IP datagram buffer 104, an A/V decoder 105, a data handler 106, an A/V post processor 107, EMM/ECM processor 108, a smart card controller 109, a smart card DB 110, a smart card 111, and a charge adjustment processor 112.

The tuner 101 receives MH broadcasting signal, which includes mobile service data and main service data. The MH baseband processor 102 demodulates the MH broadcasting signal. Accordingly, an output signal of the MH baseband processor 102 could be RS (Reed-Solomon) frame. The RS frame buffer 103 can temporarily store RS frame.

The IP datagram buffer 104 can extract IP datagram using a type indicator field of MH packet of the RS frame, wherein the IP datagram can include control data (for example, ECM, EMM, etc.) and A/V data. In more detail, according to the embodiment of the present invention, the control data and the A/V data are encapsulated by the IP datagram. Accordingly, the IP datagram buffer 104 can extract the control data from the extracted IP datagram. However, the control data may be encapsulated by the IP datagram, or may not be encapsulated by the IP datagram. The IP datagram buffer 104 temporarily stores the extracted control data.

The EMM/ECM (entitlement management message/entitlement control message) processor 108 extracts the control data and temporarily stores the extracted control data.

Meanwhile, the A/V decoder 105 decodes audio/video streams and then transmits the decoded audio/video streams to the A/V post processor 107. The data handler 106 processes datagram required for data broadcasting and controls the processed datagram to be mixed with the A/V streams.

Particularly, the data processing method of the digital broadcasting receiver according to the embodiment of the present invention will be described in more detail with reference to the EMM/ECM processor 108, the smart card controller 109, the smart card DB 110, the smart card 111, and the charge adjustment processor 112.

The tuner 101 receives MH broadcasting signal, which includes mobile service data and main service data. The MH baseband processor 102 generates RS frame from the received MH broadcasting signal. Subsequently, the EMM/ECM processor 108 extracts the IP datagram from the first RS frame. Also, control data which includes charge adjustment (or billing) information or A/V data may be encapsulated by the extracted IP datagram. Moreover, the EMM/ECM processor 108 extracts the control data from the extracted IP datagram.

However, the charge adjustment (or billing) information includes information of amount required to use a service provided by at least one service provider, wherein the service is encrypted. The control data which includes the charge adjustment information will be described in more detail with reference to FIG. 6. For reference, the control data such as ECM, EMM, etc. may be transmitted through a transmission parameter channel (TPC), a fast information channel (FIC), and a table, or may be transmitted by being encapsulated by the IP datagram. The smart card controller 109 determines whether the service is available, by comparing the charge adjustment information extracted from the EMM/ECM processor 108 with remaining charge information written in the smart card 111. As a result, if the service is available, the smart card controller 109 controls the encrypted service of the second RS frame using the control data, so that the encrypted service is decrypted. Of course, the present invention may be designed that the service is controlled by the RS frame buffer 103, the IP datagram buffer 104, and the EMM/ECM processor 108. Also, the first RS frame and the second RS frame are the same RS frames as each other, or may be separate RS frames.

The smart card DB 110 maps the extracted charge adjustment (or billing) information with its corresponding service provider and then stores the resultant information. Of course, the present invention may be designed that the smart card 111 stores the extracted charge information.

Moreover, the charge adjustment processor 112 may transmit a request signal to a shopping center or a billing server, wherein the request signal requests recharge of a charge written in the smart card 111. Also, the charge adjustment processor 112 calculates charge adjustment information allocated to each service provider based on the charge adjustment information stored in the smart card DB 110 or the smart card 111, encrypts the charge adjustment information per service provider, and transmits the encrypted charge adjustment information to the billing server.

As described above, according to the embodiment of the present invention, encrypted pay services provided by a plurality of service providers can easily be processed by only one smart card in a digital broadcasting environment, especially mobile digital broadcasting environment. Also, according to the embodiment of the present invention, it is possible to solve a conventional problem that a payment process between a smart card and a broadcasting station should be performed whenever a user uses a digital pay broadcasting service according to the related art. Also, since a digital pay broadcasting service fee is stored and redistributed in a unit of service provider, it is possible to improve data processing speed and efficiency. Moreover, according to the embodiment of the present invention, it is possible to solve another conventional problem that viewing pattern and personal information of a user are disclosed as charge adjustment information between a smart card and a broadcasting station and personal information of the user are transmitted and received when the user uses a digital pay broadcasting service according to the relate art. Also, since a digital pay broadcasting service fee is stored and redistributed in a unit of service provider, there is no possibility that personal information may be disclosed.

Meanwhile, the aforementioned charge adjustment information can, for example, include information identifying that the service is a pay service, information identifying a type of a charge adjustment method, and amount information of the service. Also, the information identifying a type of a charge adjustment method may be designed to represent a time unit type or a service unit type.

If the information identifying a type of a charge adjustment method represents a time unit type, the smart card DB 110 or the smart card 111 maps the amount information of the service with its corresponding service provider and then stores the resultant information in proportion to the time when the pay service is displayed. Therefore, according to the embodiment of the present invention, it is advantageous in that mobile service data can be used at a relatively low cost in a mobile digital broadcasting environment.

Meanwhile, if the information identifying a type of a charge adjustment method represents a service unit type, the smart card controller 109 can regard that the service is available only if the amount information of the service is less than the remaining charge information written in the smart card 111.

Furthermore, the data processing method of the digital broadcasting receiver according to the embodiment of the present invention will be described in more detail with reference to FIG. 2 to FIG. 8. However, it is to be understood that the scope of the present invention will not be limited by the description of each drawing, and the scope should be defined in accordance with claims.

Figure 2:
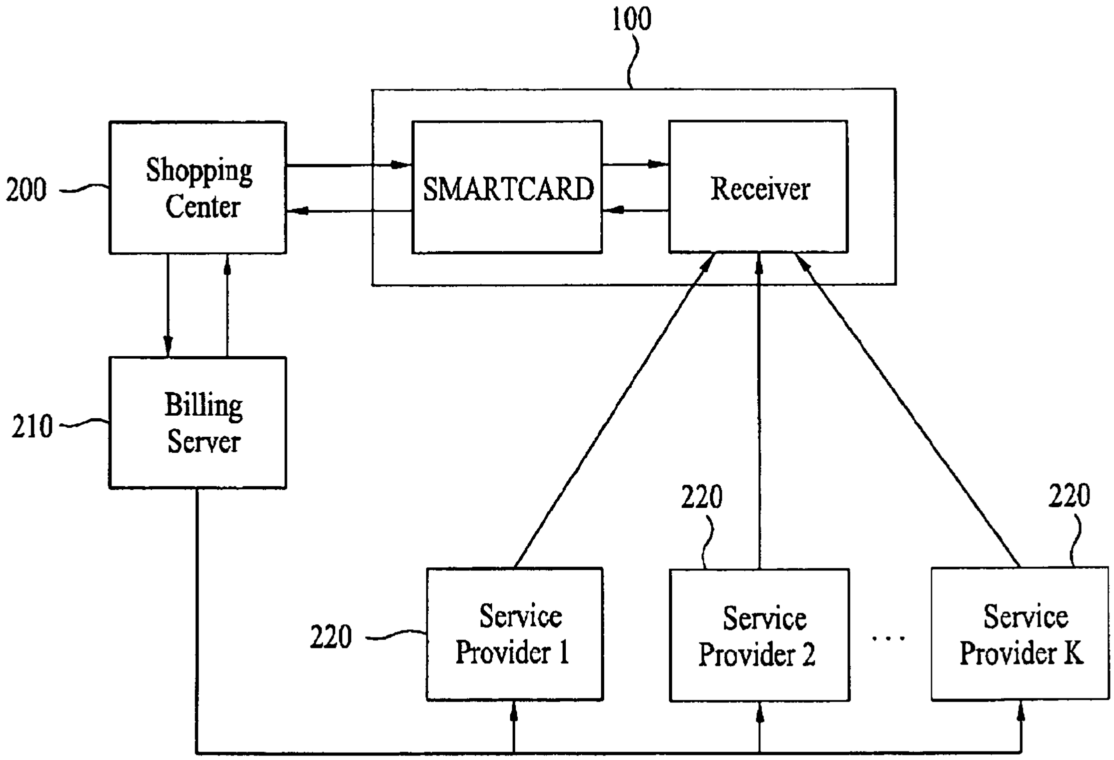
FIG. 2 illustrates a whole system which includes a digital broadcasting receiver and a plurality of service providers according to one embodiment of the present invention.

FIG. 2 illustrates a whole system which includes a digital broadcasting receiver and a plurality of service providers according to the embodiment of the present invention. Hereinafter, a control signal flow between the digital broadcasting receiver and the plurality of service providers according to the embodiment of the present invention will be described with reference to FIG. 2.

As illustrated in FIG. 2, the plurality of service providers 220 commonly include a single charge adjustment system, or encrypt a digital broadcasting service through a given charge adjustment system and transmit the encrypted service to the digital broadcasting receiver 100. However, the service providers may be a broadcasting station or contents provider, for example.

Furthermore, when the digital broadcasting service is transmitted, viewing level information, billing information, and other control information are transmitted together with the digital broadcasting service. For forgery prevention of the aforementioned information, a public key based digital signing method can be used. Accordingly, the smart card is designed to have public key related information to identify forgery of information transmitted from the service providers 220.

As illustrated in FIG. 2, the digital broadcasting receiver 100 receives a signal transmitted from the service providers 220 and identifies whether the transmitted service is a pay service or a free service. If the transmitted service corresponds to a free service, the digital broadcasting receiver 100 directly displays the service. If the transmitted service corresponds to a pay service, the digital broadcasting receiver 100 determines whether the service can be used with the balance of the smart card. If the digital broadcasting receiver 100 uses the pay service, it stores the amount according to the corresponding service and its corresponding service provider.

Meanwhile, information on the amount according to the stored service and corresponding service provider can be transmitted to a shopping center 200 or a billing server 210. Also, if recharge of the smart card is required, the present invention can be designed so that the information is transmitted to the shopping center 200 or the billing server 210.

The shopping center 200 may serve to sell and recharge the smart card and serve as a return channel. Also, the shopping center 200 may serve to receive service use information per service provider stored in the smart card and transfer the received service use information to the billing server.

Also, the billing server 210 can distribute proper profits to each service provider based on the service use information per service provider, which is received through the shopping center 200. However, one server or module may serve as the shopping center 200 and the billing server 210.

Figure 3:
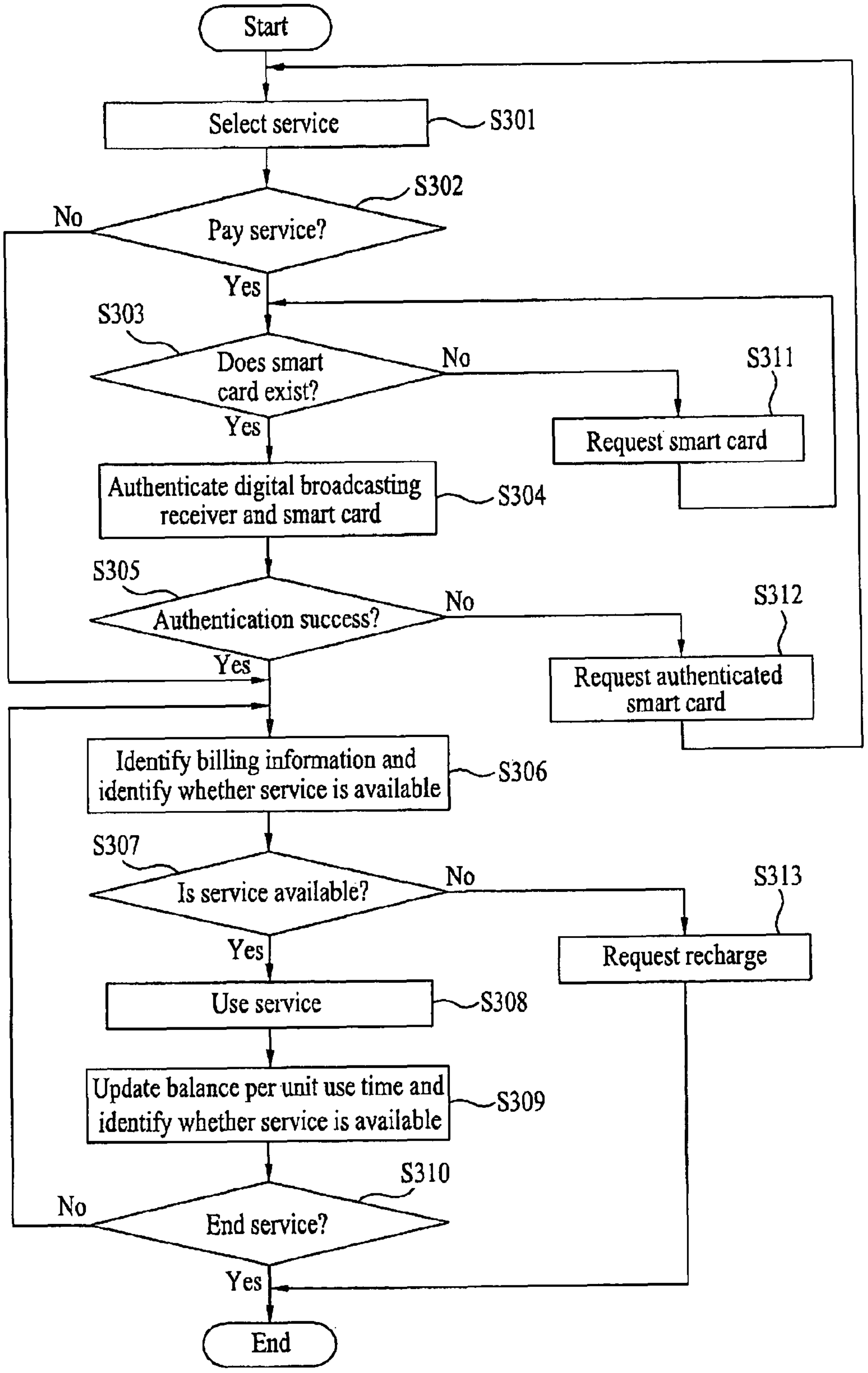
FIG. 3 is a flow chart illustrating a data processing procedure of a digital broadcasting receiver according to one embodiment of the present invention.

FIG. 3 is a flow chart illustrating a data processing procedure of a digital broadcasting receiver according to the embodiment of the present invention. Hereinafter, a procedure of processing a pay digital broadcasting service using a smart card in the digital broadcasting receiver according to the embodiment of the present invention will be described with reference to FIG. 3.

The digital broadcasting receiver according to the embodiment of the present invention selects a specific service of digital broadcasting (S301), and determines whether the service is a pay service, using the aforementioned control data (S302).

As a result of the step S302, if the service is a pay service, it is determined whether the digital broadcasting receiver includes a smart card (S303). As a result of the step S303, if the digital broadcasting receiver does not include a smart card, it displays a guide screen requesting a smart card (S311).

On the other hand, if the digital broadcasting receiver includes a smart card, authentication is performed for the digital broadcasting receiver and the smart card (S304). Subsequently, it is determined whether the authentication process has been performed successfully (S305) As a result of the step S305, if the authentication process has not been performed successfully, a guide screen requesting an authenticated smart card is displayed (S312).

In other words, it is necessary to identify whether the smart card connected with the digital broadcasting receiver is a proper smart card that can process the current digital broadcasting service. This is required for settlement of charge adjustment.

On the other hand, as a result of the step S305, if the authentication process has been performed successfully, billing information of the service is identified, and it is identified whether the service is available (S306). Namely, the digital broadcasting receiver determines whether the service is available (S307). As a result, if the service is not available, the digital broadcasting receiver displays a guide screen requesting recharge, for example (S313). On the other hand, if the service is available, the digital broadcasting receiver performs a control function so that the service is available (S308).

Furthermore, the digital broadcasting receiver performs a control function so that the balance of the smart card is updated in a unit of service use time, and identifies whether to continuously use the service (S309). The digital broadcasting receiver determines whether the service has ended (S310), and if the service has not ended, the digital broadcasting receiver returns to the step S306.

Moreover, the digital broadcasting receiver stores amount information of the displayed pay service and information of corresponding service provider in the smart card. It is advantageous in that reasonable profits can be distributed to the plurality of service providers through the aforementioned storing procedure.

Figure 4:
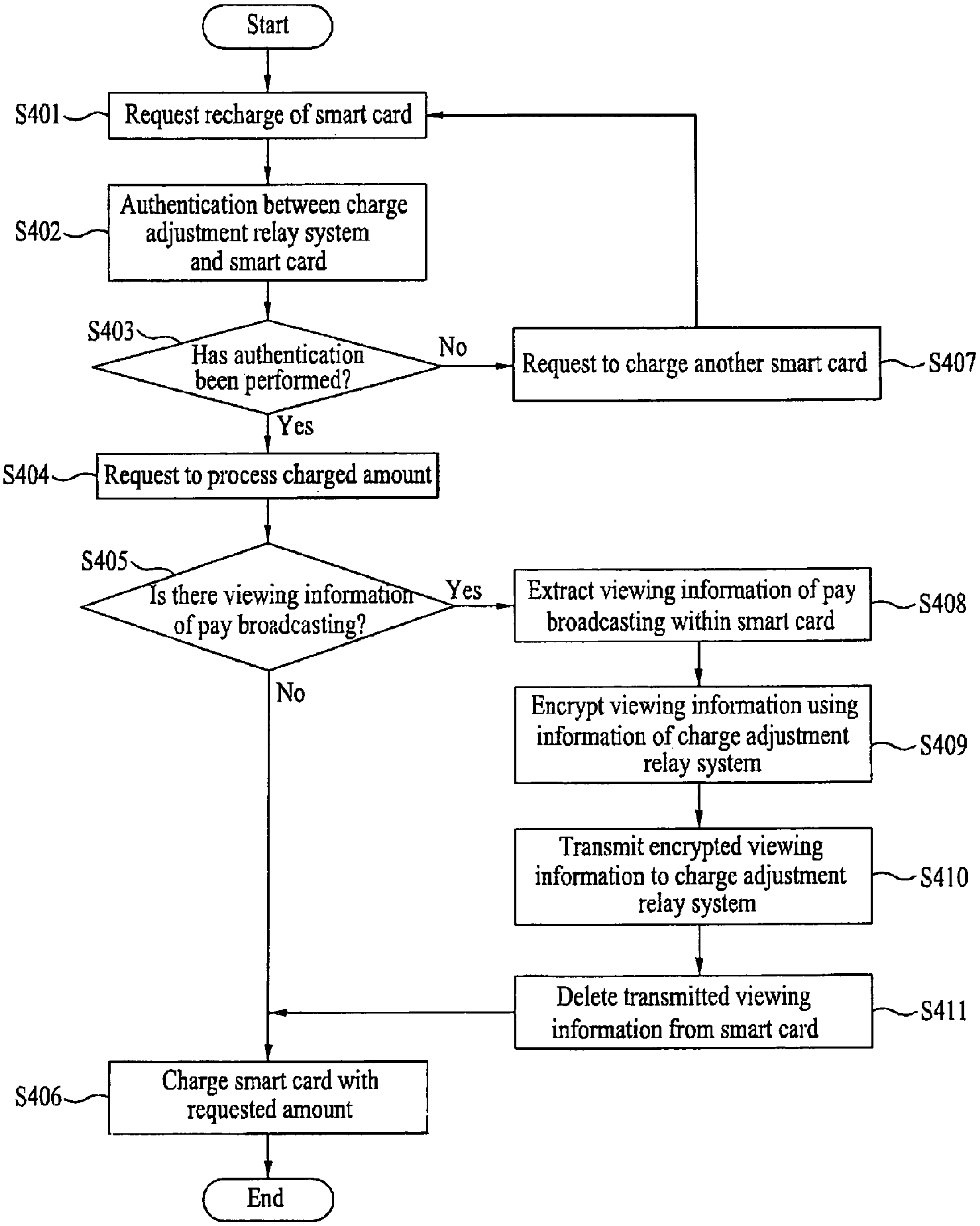
FIG. 4 is a flow chart illustrating a procedure of transmitting charge adjustment information in a data processing procedure of a digital broadcasting receiver according to one embodiment of the present invention.

FIG. 4 is a flow chart illustrating a procedure of transmitting charge adjustment information in a data processing procedure of the digital broadcasting receiver according to the embodiment of the present invention.

As illustrated in FIG. 4, the digital broadcasting receiver according to the embodiment of the present invention transmits a request signal requesting charge of the smart card (S401). Subsequently, the digital broadcasting receiver performs an authentication procedure between a charge adjustment relay system and the smart card (S402). The charge adjustment relay system could be a billing server illustrated in FIG. 2. Also, the authentication procedure (S402) is a process for safely transmitting information related to fair charge adjustment and viewing details to the charge adjustment relay system.

Furthermore, as a result of the step S402, the digital broadcasting receiver determines whether the authentication procedure has been performed successfully (S403). As a result of the step S403, if the authentication procedure has not been performed successfully, the digital broadcasting receiver displays a guide screen requesting charge of another smart card (S407). On the other hand, if the authentication procedure has been performed successfully as a result of the step S403, the digital broadcasting receiver requests the charge adjustment relay system to process a predetermined charge amount as requested (S404). Also, the digital broadcasting receiver determines whether information of pay broadcasting viewing details exists within the smart card (S405). As a result of the step S405, if the information of pay broadcasting viewing details does not exist, the charge adjustment relay system directly charges the smart card with the requested amount (S406). As aforementioned with reference to FIG. 1, the information of pay broadcasting viewing details can include both charge adjustment information of the used service and information of service provider which provides the service.

On the other hand, as a result of the step S405, if the information of pay broadcasting viewing details exists, the digital broadcasting receiver extracts the information of pay broadcasting viewing details within the smart card (S408). The digital broadcasting receiver encrypts the information of the viewing details using the information of the charge adjustment relay system (S409). Also, the digital broadcasting receiver transmits the encrypted information of the viewing details to the charge adjustment relay system (S410). The digital broadcasting receiver deletes the information of the viewing details from the smart card (S411).

Therefore, proper charge adjustment can be performed for each of the service providers in accordance with use details of the service provided by each service provider, based on the information collected in the charge adjustment relay system or the billing server. Meanwhile, the charge adjustment relay system may be managed by a communication provider or other service providers.

Moreover, according to the embodiment of the present invention, the information collected in the charge adjustment relay system or the billing server can be analyzed to analyze how much a pay service of what service provider has been paid by users to view the pay service. In this case, even though several service providers provide pay services, it is possible to adjust a charge from users of the digital broadcasting receiver more easily than the related art and at one time.

Figure 5:
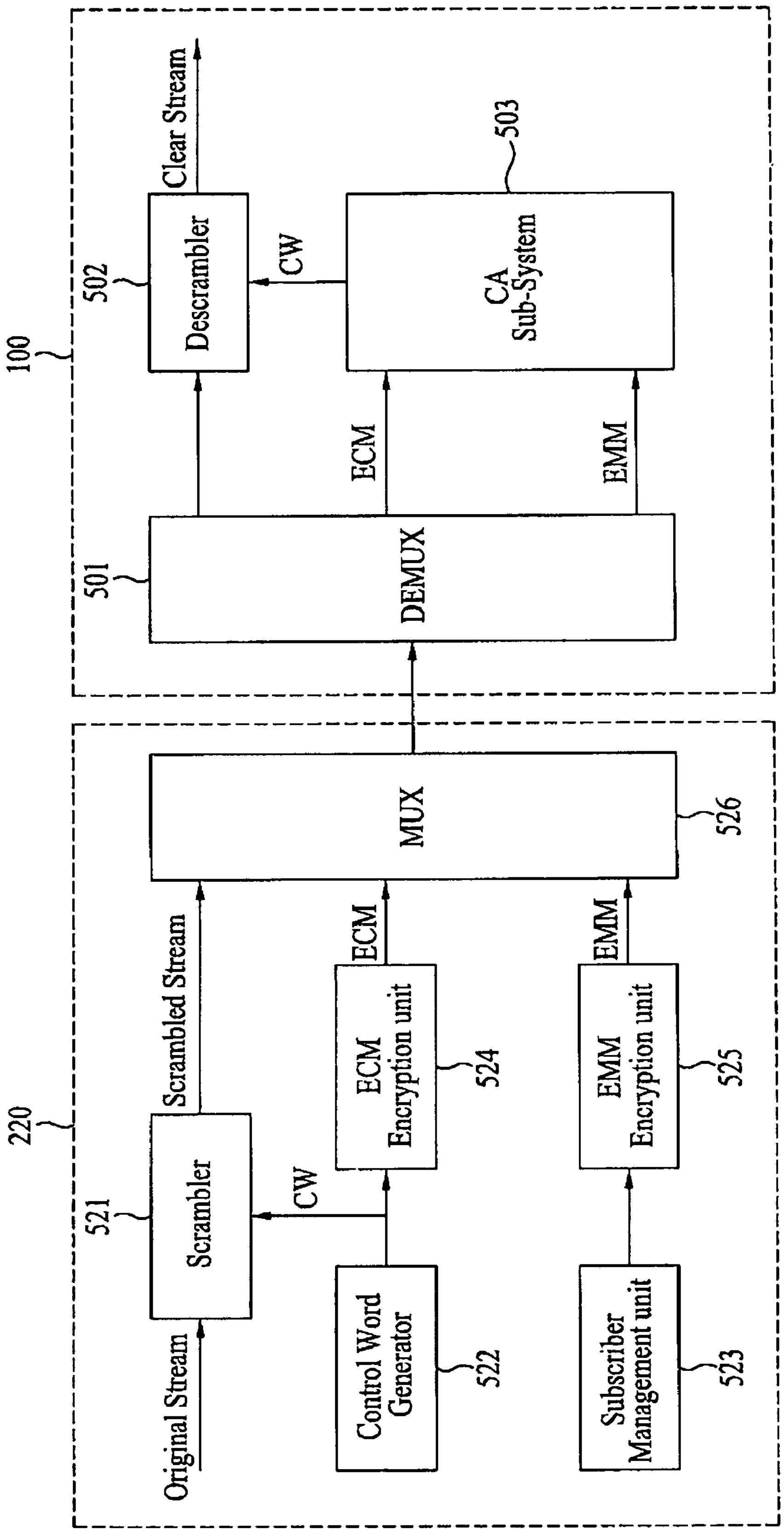
FIG. 5 illustrates a configuration of a service provider and a digital broadcasting receiver according to one embodiment of the present invention.

FIG. 5 illustrates a configuration of a digital broadcasting receiver and a service provider according to the embodiment of the present invention. Hereinafter, a procedure of transmitting and receiving control data between the digital broadcasting receiver and the service provider will be described with reference to FIG. 5. Examples of the control data include EMM (entitlement management message) and ECM (entitlement control message). The ECM may include CW (control word). Also, the control data such as ECM may be transmitted through TPC (transmission parameter channel), FIC (fast information channel), table, etc.

For reference, the digital broadcasting receiver 100 illustrated in FIG. 5 is simplified from the digital broadcasting receiver 100 illustrated in FIG. 1, and the present invention can easily be understood by the skilled person through the description of the present invention and the drawings.

As illustrated in FIG. 5, the service provider 220 according to the embodiment of the present invention can include a scrambler 521, a CW generator 522, a subscriber management unit 523, an ECM encryption unit 524, an EMM encryption unit 525, and a multiplexer 526. Meanwhile, as illustrated in FIG. 5, the digital broadcasting receiver 100 according to the embodiment of the present invention can include a demultiplexer 501, a descrambler 502, and a CA sub-system (control access sub-system).

The service provider 220 can transmit data, which include billing information of a pay service, date, time, and information of relation between a pay service and a service fee, to the digital broadcasting receiver 100. To this end, ECM packets can be used.

Meanwhile, if the ECM packets are used in accordance with the embodiment of the present invention, the ECM packets are transmitted together with streams of the encrypted pay service. Accordingly, the digital broadcasting receiver 100 should receive the ECM packets to output the encrypted pay service.

In more detail, examples of the ECM packets can include protocol number, identification number of service provider, CW, date, time, recording control information, and variable data.

In other words, the CW generator 522 and the ECM encryption unit 524 transmit the ECM to the multiplexer 526, and the scrambler 521 converts original streams into scrambled streams using the CW extracted from the CW generator 522 and then transmits the converted streams to the multiplexer 526. If the subscriber management unit 523 and the EMM encryption unit 525 transmit the EMM to the multiplexer 526, the multiplexer 526 multiplexes the scrambled streams, the ECM and the EMM and then transmits the multiplexed signals to the demultiplexer 501 of the digital broadcasting receiver 100.

The demultiplexer 501 demultiplexes the received signals and then transmits the ECM and the EMM to the CA sub-system 503 and the scrambled streams to the descrambler 502. The descrambler 502 extracts the CW from the CA sub-system 503 and converts the scrambled streams into the original streams which are not encrypted, using the extracted CW.

As described above, the service provider according to the embodiment of the present invention is advantageous in that when the ECM packets which include several kinds of information required for charge adjustment are transmitted, an authentication procedure as to whether the several kinds of information is fair is not separately required. Since the several kinds of information required for charge adjustment can be transmitted to the digital broadcasting receiver using a procedure of packetizing the existing ECM, it is advantageous in that backward compatibility can be ensured.

Figure 6:
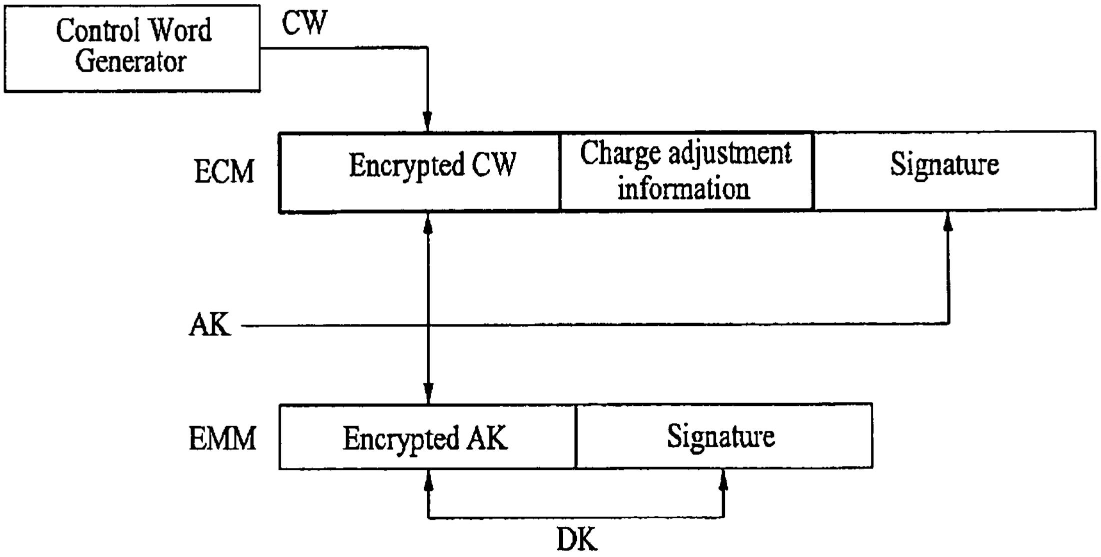
FIG. 6 schematically illustrates a procedure of packetizing charge adjustment information using ECM packets in accordance with one embodiment of the present invention.
Figure 7:
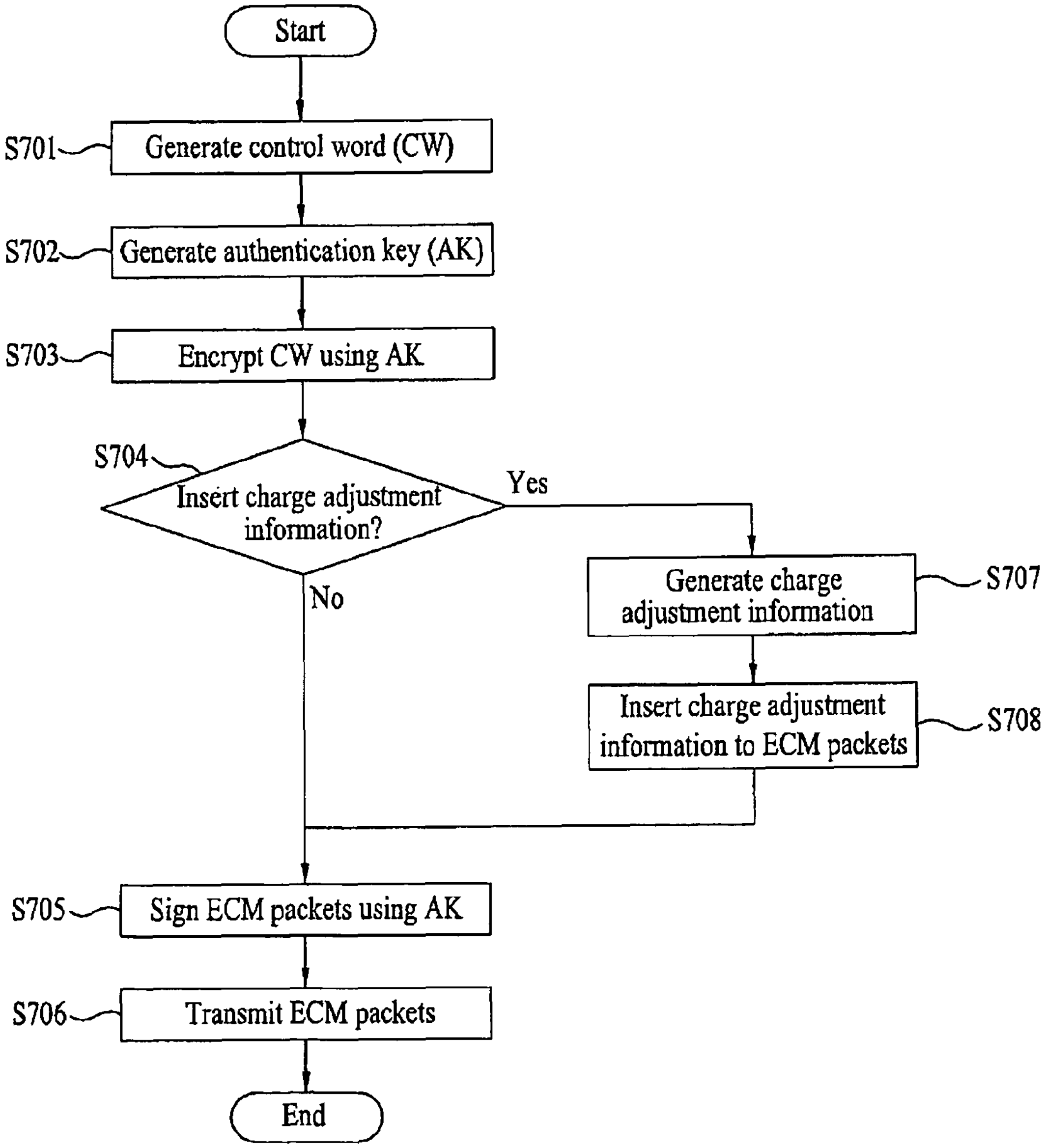
FIG. 7 is a timing flow chart illustrating a procedure of packetizing charge adjustment information using ECM packets in accordance with one embodiment of the present invention.

FIG. 6 schematically illustrates a procedure of packetizing charge adjustment information using ECM packets in accordance with the embodiment of the present invention. FIG. 7 is a timing flow chart illustrating a procedure of packetizing charge adjustment information using ECM packets in accordance with the embodiment of the present invention.

As illustrated in FIG. 6, the control data newly suggested in the present invention packetize charge adjustment information using the ECM packets. Namely, the control data which include charge adjustment information according to the embodiment of the present invention can include ECM which includes encrypted control word, charge adjustment information, and signature information. Also, the control data can be designed to include EMM which includes encrypted authentication key, and signature information.

In other words, as illustrated in FIG. 7, the service provider according to the embodiment of the present invention first generates CW required to encrypt a digital broadcasting service (S701). The service provider generates an authentication key (AK) required to authenticate ECM packets (S702), and encrypts the CW using the generated AK. Also, the service provider determines whether the digital broadcasting service is a pay service. Namely, the service provider determines whether it is necessary to insert the charge adjustment information (S704). As a result of the step S704, if it is necessary to insert the charge adjustment information, the service provider generates the charge adjustment information (S707). Also, the service provider inserts the generated charge adjustment information into the ECM packets (S708).

The service provider additionally inserts digital signature information into the ECM packets, which include encrypted CW and charge adjustment information, using the generated AK (S705). The step S705 is a process for identifying whether the digital broadcasting receiver has fair ECM packets. Moreover, the service provider transmits the ECM packets generated through the aforementioned steps to the digital broadcasting receiver (S706).

For reference, as described above, the charge adjustment information can be designed to include information identifying that the corresponding service is a pay service, information identifying a type of a charge adjustment method, and amount information of the service.

Figure 8:
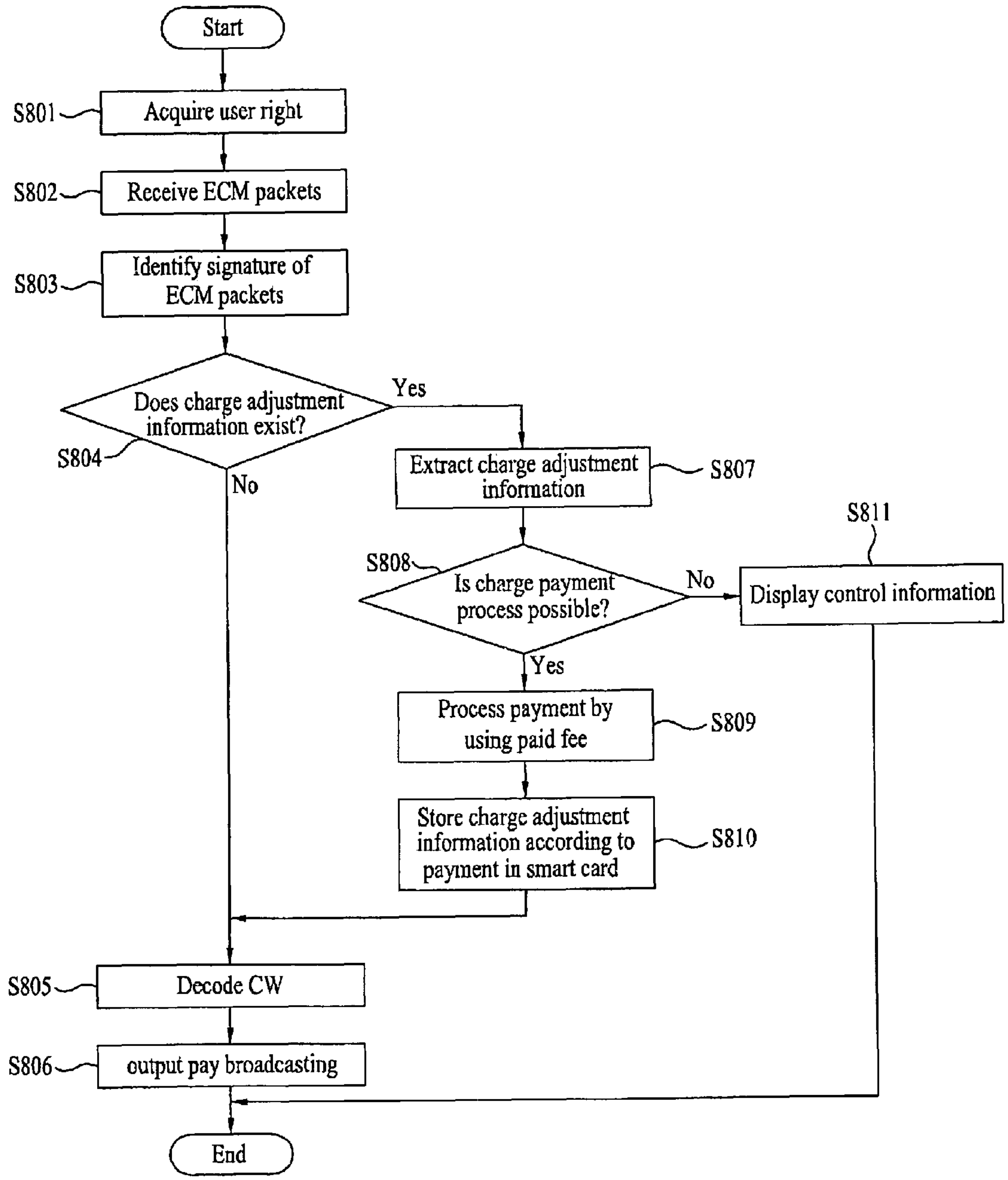
FIG. 8 is a flow chart illustrating a procedure of processing control data generated and transmitted through the procedures of FIG. 6 and FIG. 7 in a digital broadcasting receiver according to one embodiment of the present invention.

FIG. 8 is a flow chart illustrating a procedure of processing control data generated and transmitted through the procedures of FIG. 6 and FIG. 7 in a digital broadcasting receiver according to one embodiment of the present invention. Hereinafter, a procedure of extracting charge adjustment information using control data (for example, ECM packets) to normally output a pay service in a digital broadcasting receiver according to the embodiment of the present invention will be described with reference to FIG. 8.

First of all, the digital broadcasting receiver according to the embodiment of the present invention performs a process of obtaining a right to use the digital pay service (S801). Subsequently, the digital broadcasting receiver receives control data, for example, ECM packets (S802).

Meanwhile, the digital broadcasting receiver can directly process the received ECM packets. Alternatively, the digital broadcasting receiver transmits the received ECM packets to the smart card. The smart card within the digital broadcasting receiver identifies whether the ECM packets are fair. For example, the smart card can identify whether the ECM packets are fair, using the signature information of the ECM packets (S803).

Furthermore, the digital broadcasting receiver determines whether the charge adjustment information is included in the received ECM packets (S804). As a result of the step S804, if the charge adjustment information is included in the received ECM packets, the digital broadcasting receiver extracts the charge adjustment information from the ECM packets (S807). Moreover, the digital broadcasting receiver determines whether charge payment of the corresponding service is available, by comparing the extracted charge adjustment information with remaining charge information written in the smart card (S808).

As a result of the step S808, if charge payment of the corresponding service is not available, the digital broadcasting receiver displays control information that the charge payment is not available (S811). On the other hand, as a result of the step S808, if the charge payment is available, the digital broadcasting receiver performs a control function using the balance written in the smart card, so that payment is performed (S809). Moreover, the digital broadcasting receiver stores the charge adjustment information according to the payment (S809) in the smart card or another storage unit therein (S810). As described above, the charge adjustment information could be information used when proper profits are distributed to each service provider later.

The digital broadcasting receiver decodes the encrypted CW of the ECM packets (S805), and performs a control function using the decoded CW to normally output the corresponding service (S806).

As described above, according to the embodiment of the present invention, profits of services provided by the respective service providers can be distributed to the service providers more easily using only one smart card. Also, the system required for charge adjustment is not required for each of the service providers.

Also, according to the embodiment of the present invention, since personal information is not needed for payment of the service fee, there is no possibility that personal information or viewing details of the user of the digital broadcasting receiver may be disclosed.

The method according to the present invention can be implemented in a program instruction type that can be performed through various computer means and can be recorded in a computer readable recording medium. The computer readable recording medium can include program instructions, data files, and data structures, alone or in combination. The program instructions recorded in the computer readable recording medium are designed specially for the present invention but may be well known to those skilled in the computer software. Examples of the computer readable recording medium include magnetic media such as hard disks, floppy disks, and magnetic tapes, optical media such as CD-ROM and DVD, magneto-optical media such as floppy disks, and a hardware device such as ROM, RAM, and flash memory, which is configured to store and perform program instructions. Examples of the program instructions include a machine language code made by a compiler and a high-level language code implemented using an interpreter by a computer. The hardware device can be configured as at least one software module to perform the operation of the present invention.

Therefore, according to the embodiment of the present invention, it is possible to activate the pay service in the digital broadcasting environment (for example, mobile digital broadcasting environment) and efficiently manage the process related to the pay service.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A data processing method of a digital broadcasting receiver, the data processing method comprising:

receiving a mobile/handheld (MH) broadcasting signal including mobile service data and main service data;

generating Reed-Solomon (RS) frames from the received MH broadcasting signal;

extracting control data from a first RS frame, wherein:

the control data includes charge adjustment information required to use a service provided by at least one service provider, an encrypted control message (ECM), and an entitlement management message (EMM);

the service is encrypted;

the charge adjustment information includes information identifying that the service is a pay service, information identifying a type of a charge adjustment method, and amount information of the service;

the ECM includes an encrypted control word, charge adjustment information, and signature information;

the EMM includes an encrypted authentication key and signature information; and the step of extracting the control data comprises:

extracting IP datagram from the first RS frame; and extracting the control data from the extracted IP datagram;

determining whether the service is available by comparing the extracted charge adjustment information with balance information written in a smart card;

controlling a second RS frame using the control data such that an encrypted service of the second RS frame is decrypted if the service is available; mapping the extracted charge adjustment information with a corresponding service provider and storing the mapped charge adjustment information;

requesting recharge of an amount written in the smart card;

calculating charge adjustment information allocated to each service provider based on the stored charge adjustment information; and transmitting the calculated charge adjustment information per service provider to a billing server by encrypting the calculated charge adjustment information.

2. The data processing method of claim 1, wherein, if the information identifying a type of the charge adjustment information represents a time unit type, the step of storing the mapped charge adjustment information includes mapping the amount information of the service with the at least one service provider in proportion to time when the service is displayed.

3. The data processing method of claim 1, wherein, if the information identifying a type of the charge adjustment information represents a service unit type, the step of determining whether the service is available includes regarding that the service is available only if the amount information of the service is less than the balance information written in the smart card.

4. A non-transitory computer readable recording medium recording a program for implementing the data processing method of claim 1.

5. A digital broadcasting receiver comprising:

a receiver configured to receive a mobile/handheld (MH) broadcasting signal including mobile service data and main service data;

a generator configured to generate a Reed-Solomon (RS) frame from the received MH broadcasting signal;

an extractor configured to extract control data from the RS frame by extracting IP datagram from the RS frame and extracting the control data from the extracted IP datagram, the control data including charge adjustment information required to use a service provided by at least one service provider, the service being encrypted;

a decision unit configured to determine whether the service is available by comparing the extracted charge adjustment information with balance information written in a smart card;

a controller configured to control the encrypted service using the control data such that the encrypted service is decrypted if the service is available; and a storage unit configured to map the extracted charge adjustment information with a corresponding service provider and storing the mapped charge adjustment information, wherein:

the controller is further configured to:

request recharge of an amount written in the smart card;

calculate charge adjustment information allocated to each service provider based on the stored charge adjustment information; and cause transmission of the calculated charge adjustment information per service provider to a billing server by encrypting the calculated charge adjustment information;

the charge adjustment information includes information identifying that the service is a pay service, information identifying a type of a charge adjustment method, and amount information of the service;

the control data further includes an encrypted control message (ECM) and an entitlement management message (EMM);

the ECM includes an encrypted control word, charge adjustment information, and signature information; and the EMM includes an encrypted authentication key and signature information.

6. The digital broadcasting receiver of claim 5, wherein the storage unit corresponds to the smart card.

* * * * *